United States Patent
Lee et al.

(10) Patent No.: US 11,525,688 B2
(45) Date of Patent: Dec. 13, 2022

(54) METHOD AND APPARATUS FOR DETERMINING OBJECT POSITION

(71) Applicant: Samsung Electronics Co., Ltd., Suwon-si (KR)

(72) Inventors: Wonju Lee, Suwon-si (KR); Jahoo Koo, Seoul (KR); DongWook Lee, Hwaseong-si (KR); Jaewoo Lee, Hwaseong-si (KR); Dae Hyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1010 days.

(21) Appl. No.: 16/135,160

(22) Filed: Sep. 19, 2018

(65) Prior Publication Data
US 2019/0186925 A1    Jun. 20, 2019

(30) Foreign Application Priority Data
Dec. 15, 2017  (KR) .................. 10-2017-0172885
Jul. 9, 2018    (KR) .................. 10-2018-0079499

(51) Int. Cl.
| G01C 21/16 | (2006.01) |
| G01C 21/30 | (2006.01) |
| G01C 21/12 | (2006.01) |
| G01C 21/36 | (2006.01) |
| G01C 21/28 | (2006.01) |

(52) U.S. Cl.
CPC .............. *G01C 21/30* (2013.01); *G01C 21/12* (2013.01); *G01C 21/28* (2013.01); *G01C 21/3658* (2013.01); *G01C 21/3667* (2013.01)

(58) Field of Classification Search
CPC ........ G01C 21/30; G01C 21/28; G01C 21/12; G01C 21/3667; G01C 21/3658; G01S 19/49
See application file for complete search history.

(56) References Cited

U.S. PATENT DOCUMENTS

| 4,796,191 A | 1/1989 | Honey et al. |
| 4,903,212 A * | 2/1990 | Yokouchi ............... G01C 21/28 701/454 |
| 5,046,011 A | 9/1991 | Kakihara et al. |
| 5,452,216 A * | 9/1995 | Mounce ............... G01C 21/203 342/357.31 |

(Continued)

FOREIGN PATENT DOCUMENTS

| JP | 7-55486 A | 3/1995 |
| JP | 2007-139601 A | 6/2007 |

(Continued)

OTHER PUBLICATIONS

Communication dated Apr. 24, 2019, issued by the European Patent Office in counterpart European Application No. 18203580.8.

(Continued)

*Primary Examiner* — Masud Ahmed
(74) *Attorney, Agent, or Firm* — Sughrue Mion, PLLC

(57) ABSTRACT

An object positioning method and apparatus is disclosed. The object positioning apparatus may obtain a reference position of an object, obtain a map-based heading angle of the object based on waypoints on a map, and determine a current position of the object based on the reference position and the map-based heading angle.

17 Claims, 10 Drawing Sheets

(56) References Cited

U.S. PATENT DOCUMENTS

| | | | |
|---|---|---|---|
| 6,024,655 A | 2/2000 | Coffee | |
| 7,548,813 B2 | 6/2009 | Komatsu | |
| 7,778,111 B2* | 8/2010 | Hawkinson | G01S 15/86 |
| | | | 367/89 |
| 8,064,643 B2 | 11/2011 | Stein et al. | |
| 8,145,419 B2 | 3/2012 | Onome et al. | |
| 8,275,497 B2 | 9/2012 | Koch-Groeber et al. | |
| 8,447,519 B2 | 5/2013 | Basnayake et al. | |
| 8,457,827 B1 | 6/2013 | Ferguson et al. | |
| 8,566,034 B1* | 10/2013 | Van Wyck Loomis | |
| | | | G01S 19/49 |
| | | | 701/480 |
| 8,700,229 B2 | 4/2014 | Seger | |
| 8,827,514 B2 | 9/2014 | Takagaki | |
| 9,090,260 B2 | 7/2015 | Clarke et al. | |
| 9,097,534 B2* | 8/2015 | Stephens | G01C 21/16 |
| 9,233,688 B2 | 1/2016 | Clarke et al. | |
| 9,283,967 B2 | 3/2016 | Lee | |
| 9,482,536 B2 | 11/2016 | Mian et al. | |
| 10,274,508 B2* | 4/2019 | Barron | G01P 5/001 |
| 2008/0262730 A1 | 10/2008 | Onome et al. | |
| 2010/0217524 A1 | 8/2010 | Oohashi et al. | |
| 2015/0281910 A1* | 10/2015 | Choudhury | H04W 4/33 |
| | | | 455/456.1 |
| 2015/0285637 A1 | 10/2015 | Kelly | |
| 2016/0003636 A1 | 1/2016 | Ng-Thow-Hing et al. | |
| 2016/0116291 A1* | 4/2016 | Chien | G01C 21/30 |
| | | | 701/519 |
| 2016/0146616 A1 | 5/2016 | Ren | |
| 2017/0166204 A1 | 6/2017 | Yoo et al. | |

FOREIGN PATENT DOCUMENTS

| | | |
|---|---|---|
| JP | 2016-223898 A | 12/2016 |
| KR | 10-2015-0025394 A | 3/2015 |
| KR | 10-1620911 B1 | 5/2016 |
| KR | 10-1674045 B1 | 11/2016 |
| WO | 2012/075465 A1 | 6/2012 |

OTHER PUBLICATIONS

Communication dated Sep. 17, 2019 issued by the European Patent Office in counterpart European Patent Application No. 18203580.8.
Makino, et al., "A method for traffic lane estimation with a smartphone", Jul. 2012, Multimedia, Dispersion, Collaboration and Mobile (DICOMO2012) Symposium, vol. 2012, Issue 1, [ISSN:1882-0840], 66 pages total.
Communication dated Jul. 26, 2022 by the Japanese Patent Office in Japanese Patent Application No. 2018-203757.

* cited by examiner

METHOD AND APPARATUS FOR DETERMINING OBJECT POSITION

CROSS-REFERENCE TO RELATED APPLICATIONS

This application claims the benefit under 35 USC § 119(a) of Korean Patent Application No. 10-2017-0172885 filed on Dec. 15, 2017, and Korean Patent Application No. 10-2018-0079499 filed on Jul. 9, 2018, in the Korean Intellectual Property Office, the entire disclosures of which are incorporated herein by reference for all purposes.

BACKGROUND

1. Field

The following description relates to an object positioning method and apparatus to locate an object.

2. Description of Related Art

Object positioning or localization technology has become more important and services based on such technology are being more widely used. The services may vary in performance and quality based on an error in estimating a position of an object. For example, a position of a vehicle may be used to set a local route for the vehicle in an autonomous driving system. The autonomous driving system may perform dead reckoning using an acceleration sensor and a direction sensor, and an error of a direction angle, or a heading angle, may be accumulated in localization. When an autonomous vehicle moves, an accumulated error in localization may have undesirable consequences, such as, for example, collision, lane departure, travel along a wrong route, and an error in setting a traveling route.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object positioning method including obtaining a reference position of an object, obtaining a map-based heading angle of the object based on waypoints on a map, and determining a current position of the object based on the reference position and the map-based heading angle.

The map may include a road represented using the waypoints on a single line.

The obtaining of the map-based heading angle may include detecting a waypoint closest to a most recently estimated position of the object, and calculating the map-based heading angle of the object based on the detected waypoint and a next waypoint subsequent to the detected waypoint.

The obtaining of the map-based heading angle may include detecting a waypoint among the waypoints based on a most recently estimated position of the object, and determining the map-based heading angle to be a heading angle corresponding to the detected waypoint.

The object positioning method may include obtaining, using at least one sensor, a speed and a sensor-based heading angle of the object, wherein the determining of the current position may include generating a second heading angle based on the map-based heading angle and the sensor-based heading angle, performing dead reckoning based on the second heading angle and the speed, and determining the current position of the object based on a result of the dead reckoning.

The generating of the second heading angle may include comparing the map-based heading angle and the sensor-based heading angle, and generating the second heading angle based on a result of the comparing.

The generating of the second heading angle may include generating the second heading angle based on the map-based heading angle, in response to a difference between the map-based heading angle and the sensor-based heading angle being in a range.

The generating of the second heading angle may include generating the second heading angle based on the sensor-based heading angle, in response to a difference between the map-based heading angle and the sensor-based heading angle being outside a range.

The object may include a vehicle, wherein the determining of the current position of the object further may include determining the current position of the object based on the sensor-based heading angle, and generating lane change information of the object based on the determined current position.

The generating of the second heading angle may include compensating for the sensor-based heading angle using the map-based heading angle, and generating the second heading angle based on the compensating.

The generating of the second heading angle may include generating the second heading angle based on applying weights to the map-based heading angle and the sensor-based heading angle.

The applying of the weights may include increasing a weight of the map-based heading angle, in response to a difference between the map-based heading angle and the sensor-based heading angle being smaller than a threshold.

The at least one sensor may include an acceleration sensor and a direction sensor.

The object may include a vehicle, wherein the obtaining of the sensor-based heading angle of the object may include obtaining an initial heading angle from a global positioning system (GPS) sensor, obtaining a steering rotation angle of the vehicle from the at least one sensor, and calculating the sensor-based heading angle of the object by applying the steering rotation angle to the initial heading angle.

The object may include a vehicle, wherein the obtaining of the speed of the object may include obtaining wheel speeds of the vehicle from the at least one sensor of the vehicle, and calculating the speed of the object based on the wheel speeds.

The obtaining of the reference position may include periodically obtaining GPS positions from a GPS sensor, and updating the reference position using a current GPS position, in response to a difference between the current GPS position of the GPS positions and a previous GPS position of the GPS positions being greater than a first threshold difference or a difference between the current GPS position and the determined current portion being lesser than a second threshold.

The object positioning method of claim 1, wherein the waypoints may be generated based on position information recorded along a lane on a road.

The waypoints may include pieces of position information recorded along lanes on a road that are converted to represent a single lane.

In another general aspect, there is provided an object positioning method including obtaining a reference position of an object, estimating a current position of the object from the reference position, obtaining, from a global positioning system (GPS) sensor, a current GPS position of the object, and updating the estimated current position, in response to the current GPS position being bounced.

The updating of the estimated current position may include determining that the current GPS position is bounced in response to a difference between the current GPS position and a previous GPS position of the object being greater than a first threshold difference or a difference between the current GPS position and the estimated current position being lesser than a second threshold difference.

The current GPS position and the previous GPS position may be compensated based on a speed and a direction of the object.

The updating of the estimated current position may include updating the estimated current position to the current GPS position, in response to the current GPS position being bounced.

The current GPS position may be compensated based on a speed and a direction of the object.

In another general aspect, there is provided an apparatus for determining a position of an object, including a sensor configured to obtain the position of the object, a memory configured to store instructions, and waypoints generated based on position information recorded along a road, and a processor configured to execute the instructions to obtain a reference position of the object based on the position, detect a waypoint, from among the waypoints, proximate to the reference position, and estimate a map-based heading angle of the object based on the detected waypoint and a subsequent waypoint from among the waypoints, and determine a current position of the object based on the reference position and the map-based heading angle.

The memory may be configured to store the map-based heading angle corresponding to the waypoint.

The processor may be configured to detect the subsequent waypoint based on a recognized direction of the object.

Other features and aspects will be apparent from the following detailed description, the drawings, and the claims.

Figure 1:
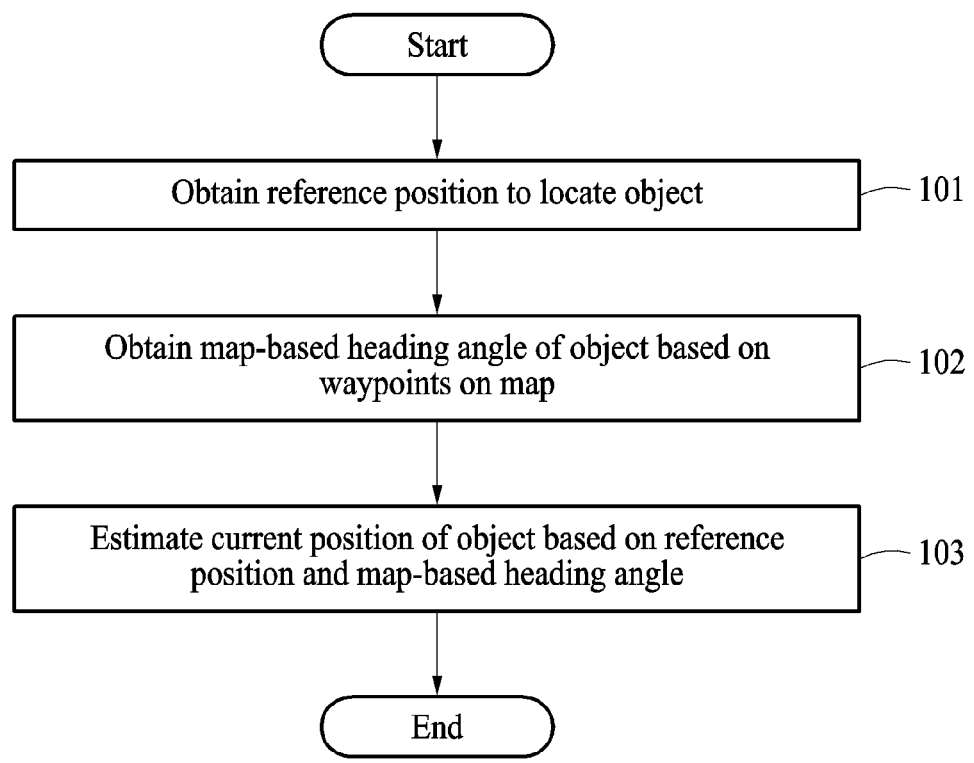
FIG. 1 is a diagram illustrating an example of an object positioning method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Also, in the description of embodiments, detailed description of well-known related structures or functions will be omitted when it is deemed that such description is redundant.

An object positioning apparatus described herein may be used to locate an object or perform localization using a heading angle estimated from a map. The object positioning apparatus may compensate for an error in accuracy of a heading angle sensed or measured from a sensor, using a method of estimating a heading angle of the object based on a pattern or a feature of a road included in the map. The object positioning apparatus may accurately locate the object or perform accurate localization, using sensor, such as, a global positioning system (GPS) and dead reckoning in a low-precision map environment.

The localization performed by the object positioning apparatus is applicable to many other fields, in addition to an autonomous driving system, that require localization.

The object positioning apparatus described herein refers to an apparatus configured to estimate a position of an object, and may be embodied in hardware module. The object positioning apparatus may generate or process operations, calculations, and instructions associated with localization of the object or locating the object. The object described herein refers to a target whose position is to be estimated or measured and may include, for example, a human being, a smartphone, a tablet computer, a wearable device, and the like, in addition to a vehicle that travels on a road.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone.

The object positioning apparatus may be embedded or incorporated in various types of computing apparatuses and/or systems, such as, for example, a vehicle, a smartphone, a tablet computer, a wearable device, and the like, various Internet of Things (IoT) devices, and also be embodied in a server communicating with a terminal. In an example, the object positioning apparatus is applicable to a robot requiring a positioning operation. In an example, the object positioning apparatus obtains information associated with the localization of the object from a database constructed in advance. The database may be embodied as a memory included in the object positioning apparatus, or an external device, such as, for example, a server connected to the object positioning apparatus through a wired or wireless network.

Hereinafter, an example of an object positioning method will be described with reference to FIGS. 1 and 2. An example of an operation of obtaining a map-based heading angle will be described with reference to FIG. 3, and an example of an operation of comparing a map-based heading angle and a sensor-based heading angle that is sensed by a sensor will be described with reference to FIG. 4. An example of an object positioning method will be described with reference to FIGS. 5A through 6. An example of an operation of obtaining a map-based heading angle will be described with reference to FIG. 7, and an example of where a map-based heading angle is used will be described with reference to FIG. 8. Further, an example of an object positioning apparatus will be described with reference to FIG. 9.

FIG. 1 is a diagram illustrating an example of an object positioning method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Figure 2:
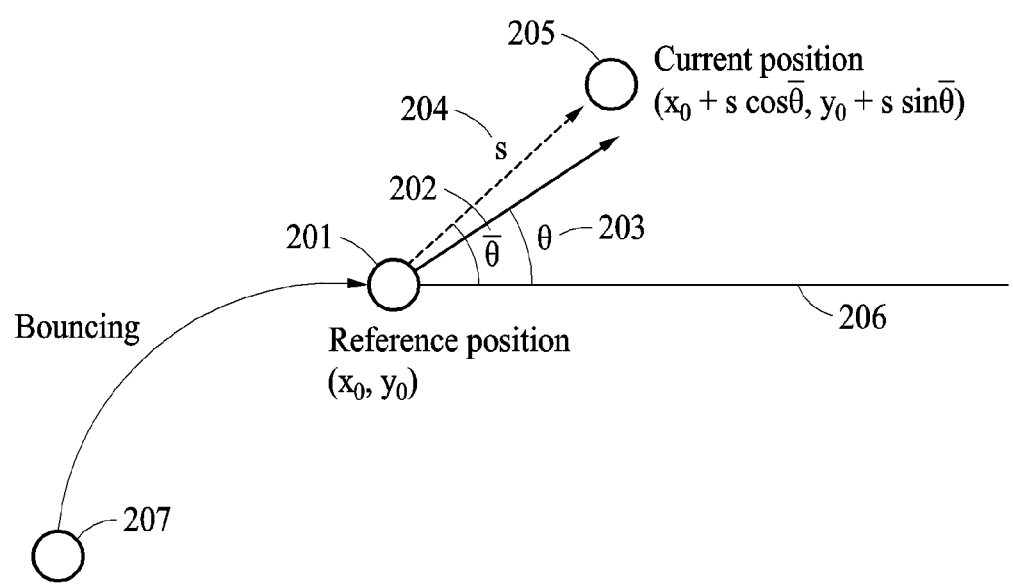
FIG. 2 is a diagram illustrating an example of an object positioning method.

FIG. 2 is a diagram illustrating an example of an object positioning method.

Referring to FIGS. 1 and 2, in operation 101, an object positioning apparatus obtains a reference position 201 to locate an object. In an example, the reference position 201 is a position that is used to locate the object, and the object positioning apparatus estimates a position of the object using the reference position 201.

In one example, the object positioning apparatus may obtain the reference position 201 based on a most recently estimated position of the object. The object positioning apparatus may repetitively perform localization or positioning on the object, and then determine the most recently estimated position to be the reference position 201. The reference position 201 may be used to estimate a current position 205. The localization and the positioning used herein may be used to locate an object, and thus, localization may also indicate the positioning. In an example, the object positioning apparatus may perform localization based on the reference position 201, and repetitively perform localization based on a position estimated from a result of the localization that is previously performed.

In an example, the object positioning apparatus may obtain the reference position 201 using a global positioning system (GPS) sensor. The object positioning apparatus may obtain position information from the GPS sensor provided in the object at set intervals, and update the reference position 201 using the position information obtained from the GPS sensor. For example, the object positioning apparatus may update the reference position 201 using a current GPS position when the current GPS position satisfying a certain condition.

Based on performance of the GPS sensor, a frequency of bouncing and an accuracy of a GPS position may vary. In an example, the object positioning apparatus applies a bias to a bounced GPS position to set the reference position 201. In an example, the object positioning apparatus monitors whether a GPS position is bounced or not to set the reference position 201. Although an example of a method of setting the reference position 201 based on a bounced GPS position is described in the foregoing, other various methods may also be used by the object positioning apparatus to obtain the reference position 201. Examples of how to determine whether a GPS position is bounced or not, and how to update the reference position 201 and initialize a position will be described with reference to FIG. 5B.

In operation 102, the object positioning apparatus obtains a map-based heading angle 202 of the object based on waypoints on a map. A waypoint refers to a point set at a certain position on the map. For example, an element included in the map, for example, a road, an address, a geographical feature, a structure, a landmark, and the like may be represented by a waypoint. The map may include a road represented using waypoints on a single line.

The waypoints on the single line may be generated based on position information recorded along a lane on the road and stored in a database. For example, position information may be recorded from a vehicle traveling along a lane on a road, waypoints may be generated based on the recorded position information, and then a map may be established or updated based on the generated waypoints.

The waypoints on the single line may be generated such that respective pieces of position information recorded along lanes on the road are converted to represent a single lane, and stored in the database. For example, vehicles may travel on lanes of a road on a map, and pieces of position information may be recorded from the vehicles. The pieces of position information of the vehicles may be distributed to the lanes, and thus the pieces of position information may be converted to a representative value or converted to represent a single lane through a statistical smoothing operation. The pieces of position information used to represent the road using waypoints on a single line may be collected and recorded, in a cloud, from the vehicles or terminals. A method of representing the road on the map using the waypoints on the single line are not limited to the example described in the foregoing, and various methods, for example, a method of using newly configured waypoints and existing waypoints, may also be used.

The object positioning apparatus may obtain, from an internal or external memory, or a server, the map including the road represented using the waypoints on the single line, and obtain the map-based heading angle 202 of the object based on the waypoints on the obtained map. The map-based heading angle 202 refers to a heading angle of the object that is obtained based on the map, and how the map-based heading angle 202 is obtained will be described in detail with reference to FIG. 3.

In operation 103, the object positioning apparatus estimates the current position 205 of the object based on the reference position 201 and the map-based heading angle 202. In an example, the object positioning apparatus estimates the current position 205 by performing dead reckoning. The dead reckoning refers to a method of estimating the current position 205 of the object by applying a speed 204 and a heading angle of the object to the reference position 201. In an example, the object positioning apparatus performs the dead reckoning based on the map-based heading angle 202, and estimates the current position 205.

The object positioning apparatus obtains the speed 204 and a heading angle, or a sensor-based heading angle 203, of the object that are sensed or measured by sensors. In an example, the object positioning apparatus obtains the speed 204 of the object from an acceleration sensor, and the sensor-based heading angle 203 of the object from a direction sensor. In an example, the object positioning apparatus generates any one of the speed 204 and the sensor-based heading angle 203 of the object from an inertial measurement unit (IMU) sensor.

The object positioning apparatus generates a second heading angle based on the map-based heading angle 202 and the sensor-based heading angle 203. The second heading angle refers to a heading angle to be applied when performing the dead reckoning. In an example, the object positioning apparatus may compare the map-based heading angle 202 and the sensor-based heading angle 203, and generate the second heading angle based on a result of the comparison.

When a difference between the map-based heading angle 202 and the sensor-based heading angle 203 is in a range, the object positioning apparatus generates the second heading angle based on the map-based heading angle 202. For example, when the difference between the map-based heading angle 202 and the sensor-based heading angle 203 is less than a threshold angle, the object positioning apparatus may estimate the current position 205 by applying the map-based heading angle 202 to the dead reckoning. The map-based heading angle 202 and the sensor-based heading angle 203 may be calculated based on a line 206.

When the difference between the map-based heading angle 202 and the sensor-based heading angle 203 is out of the range, the object positioning apparatus generates the second heading angle based on the sensor-based heading angle 203. For example, when the difference between the map-based heading angle 202 and the sensor-based heading angle 203 is greater than the threshold angle, the object positioning apparatus may estimate the current position 205 by applying the sensor-based heading angle 203 to the dead reckoning.

In another example, the object positioning apparatus generates the second heading angle by compensating for the sensor-based heading angle 203 using the map-based heading angle 202. When the map-based heading angle 202 is greater than the sensor-based heading angle 203, the object positioning apparatus compensates for the sensor-based heading angle 203 to be greater and generates the second heading angle accordingly. Similarly, when the map-based heading angle 202 is less than the sensor-based heading angle 203, the object positioning apparatus compensates for the sensor-based heading angle 203 to be smaller and generates the second heading angle accordingly. In an example, a degree of compensating of the sensor-based heading angle 203 based on the map-based heading angle 202 is based on one of a design intent, a sensor performance, a system setting, a performance, and/or an efficiency. For example, how the compensating is performed may be set based on statistical records associated with accuracies and errors of the map-based heading angle 202 and the sensor-based heading angle 203.

In another example, the object positioning apparatus generates the second heading angle by applying weights to the map-based heading angle 202 and the sensor-based heading angle 203, and applies the generated second heading angle to the dead reckoning. The weights may be set differently based on the difference between the map-based heading angle 202 and the sensor-based heading angle 203. For example, when the difference between the map-based heading angle 202 and the sensor-based heading angle 203 is greater, the object positioning apparatus sets the weight of the sensor-based heading angle 203 to be greater than the weight of the map-based heading angle 202. When the difference between the map-based heading angle 202 and the sensor-based heading angle 203 is smaller, the object positioning apparatus sets the sensor-based heading angle 203 to be smaller than the weight of the map-based heading angle 202. The weights may be defined based on one of a design intent, a sensor performance, a system setting, a performance, and/or an efficiency, and various methods may also be used to set the weights.

Referring to FIG. 2, the object positioning apparatus generates the second heading angle by compensating for the sensor-based heading angle 203 using the map-based heading angle 202. The object positioning apparatus performs the dead reckoning based on the map-based heading angle 202 and the speed 204 of the object, and estimates the current position 205 of the object based on a result of performing the dead reckoning. The object positioning apparatus may apply the map-based heading angle 202 to the dead reckoning using Equation 1.

$$\text{Current position}=(x_0+s(\cos \bar{\theta})\Delta t, y_0+s(\sin \theta)\Delta t) \quad \text{[Equation 1]}$$

In Equation 1, $(x_0, y_0)$ denotes a reference position, $\bar{\theta}$ denotes a map-based heading angle, and s denotes a speed of an object. The current position denotes a position at which the object arrives by moving from the reference position during a time $\Delta t$.

The object positioning apparatus may perform the dead reckoning using Equation 2.

$$(x_T, y_T)=(x_0+\Sigma_k s_k (\cos \bar{\theta}_k)\Delta t_k, y_0+\Sigma_k s_k (\sin \bar{\theta}_k)\Delta t_k) \quad \text{[Equation 2]}$$

In Equation 2, $(x_T, y_T)$ denotes a current position at a current time T, and $(x_0, y_0)$ denotes a reference position. $(X_T, y_T)$ may be derived from $(x_0, y_0)$ by calculating Equation 1 k times repetitively. $s_k$ and $\bar{\theta}_k$ denote a speed and a map-based heading angle, respectively. $\Delta t_k$ denotes a time, where k denotes a variable for a $\Sigma$ operation. The object positioning apparatus may perform the dead reckoning repetitively based on the reference position, and update the current position as represented by Equation 2 above.

Figure 3:
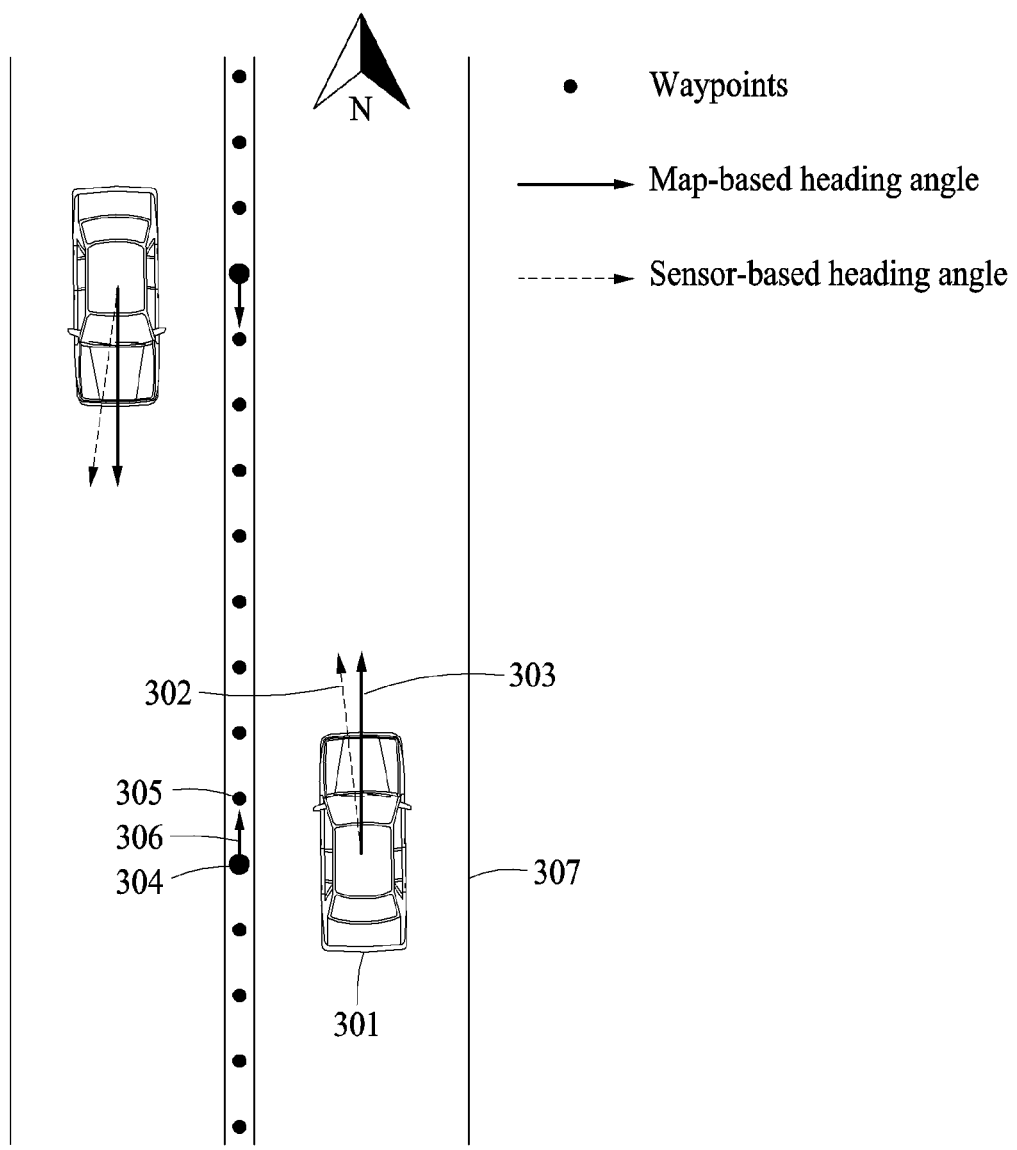
FIG. 3 is a diagram illustrating an example of an operation of obtaining a map-based heading angle.

FIG. 3 is a diagram illustrating an example of an operation of obtaining a map-based heading angle.

Referring to FIG. 3, a road 307 is represented using waypoints on a single line, and a map includes roads. An object positioning apparatus obtains a map including the road 307 represented using waypoints on the map, and obtains a map-based heading angle 303 of an object 301 using at least one of the waypoints.

In an example, the object positioning apparatus detects a waypoint 304 closest to the object 301 based on a most recently estimated position of the object 301. The object positioning apparatus calculates the map-based heading angle 303 of the object 301 based on the detected waypoint 304 and a next waypoint 305 subsequent to the detected waypoint 304. The object positioning apparatus calculates the map-based heading angle 303 of the object 301 based on a heading angle 306 connecting the waypoint 304 and the waypoint 305. In an example, the object positioning apparatus recognizes a direction in which the object 301 travels, and detects the waypoint 305 subsequent to the waypoint 304 based on the recognized direction. Because the object 301 traveling on the road 307 in the map travels from south to north as illustrated, the object positioning apparatus detects the waypoint 305 disposed in a northward direction of the waypoint 304.

In an example, a map-based heading angle corresponding to a waypoint is calculated and stored in advance. In such a case, the object positioning apparatus determines a map-based heading angle 306 corresponding to the most recently estimated waypoint 304 of the object 301 to be the map-based heading angle 303 of the object 301. In an example, map-based heading angles corresponding to the waypoints are defined in advance based on a traveling or moving direction of the vehicle and stored in a map, and the object positioning apparatus obtains the map-based heading angle 303 of the object 301 by selecting one from the waypoints based on a position of the object 301.

The object positioning apparatus generates a second heading angle to be used for dead reckoning, using the map-based heading angle 303 generated based on at least one waypoint representing the road 307 and a sensor-based heading angle 302 sensed by a sensor. Herein, a sensor-based heading angle refers to a heading angle that is sensed or measured by a sensor.

Figure 4:
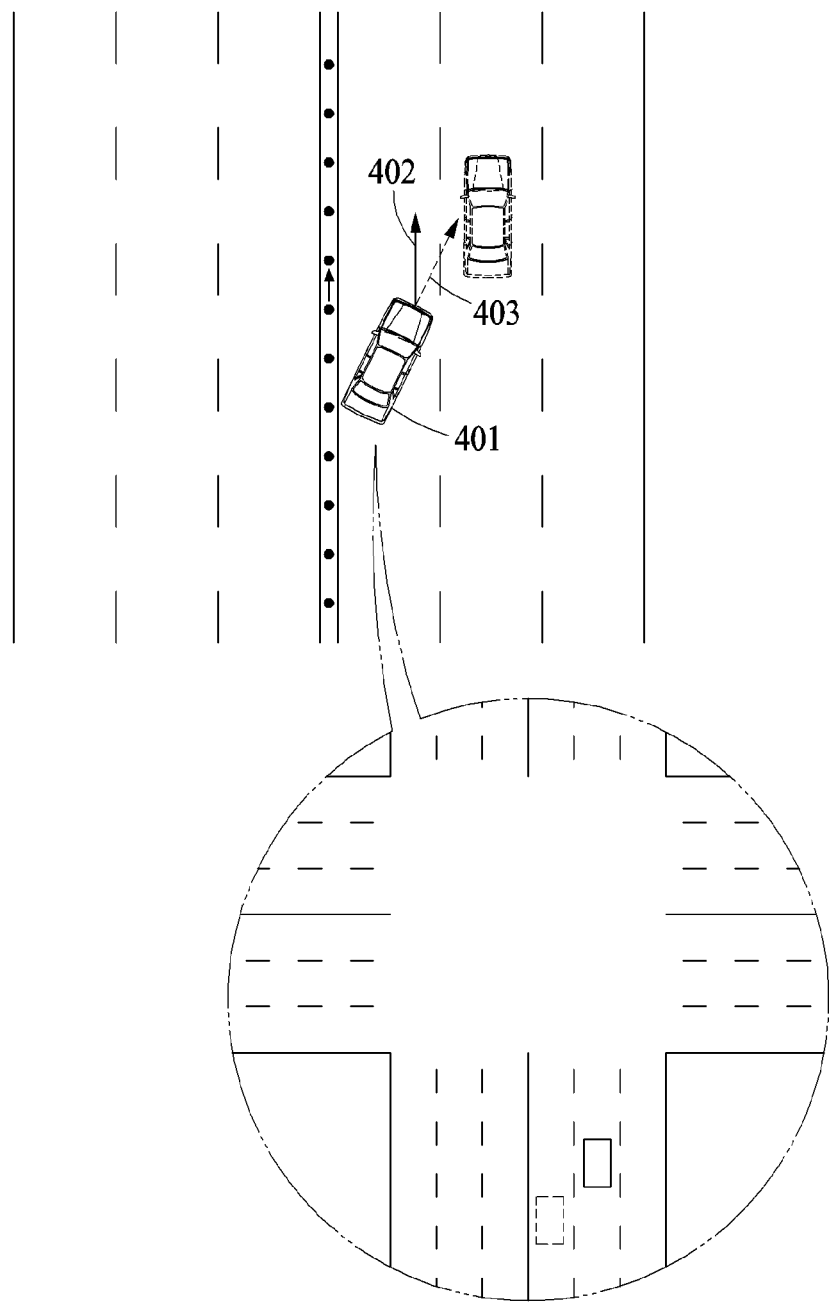
FIG. 4 is a diagram illustrating an example of an operation of comparing a map-based heading angle and a sensor-based heading angle.

FIG. 4 is a diagram illustrating an example of an operation of comparing a map-based heading angle and a sensor-based heading angle.

Referring to FIG. 4, an object 401 is a vehicle. An object positioning apparatus determines whether the object 401 changes a lane based on a map-based heading angle 402 of the object 401 and a sensor-based heading angle 403 sensed by a sensor.

The object positioning apparatus compares the map-based heading angle 402 and the sensor-based heading angle 403. In response to a difference between the map-based heading angle 402 and the sensor-based heading angle 403 being out of a range, the object positioning apparatus performs localization or locates the object 401 using the sensor-based heading angle 403. For example, the object positioning apparatus applies the sensor-based heading angle 403 to dead reckoning, and determines whether the object 401 changes a lane based on a position of the object 401 that is estimated through the dead reckoning. The object positioning apparatus determines the sensor-based heading angle 403 to be a heading angle for the localization, and determines that the object 401 changes a lane from a first lane to a second lane by performing the dead reckoning. In an example. such lane change information from the object positioning apparatus is displayed through a display of the object 401. For example, when a navigation service is provided by a terminal provided in the object 401, the object positioning apparatus transfers the lane change information to the terminal, and the lane change information is displayed on a display of the terminal provided in the object 401. In an example, when autonomous driving system is used, the lance change information is provided to the autonomous driving system of the vehicle 401. In another example, to better manage traffic and prevent collisions, the lance change information is sent to a server or another vehicle in the vicinity of the vehicle 401.

Figure 5A:
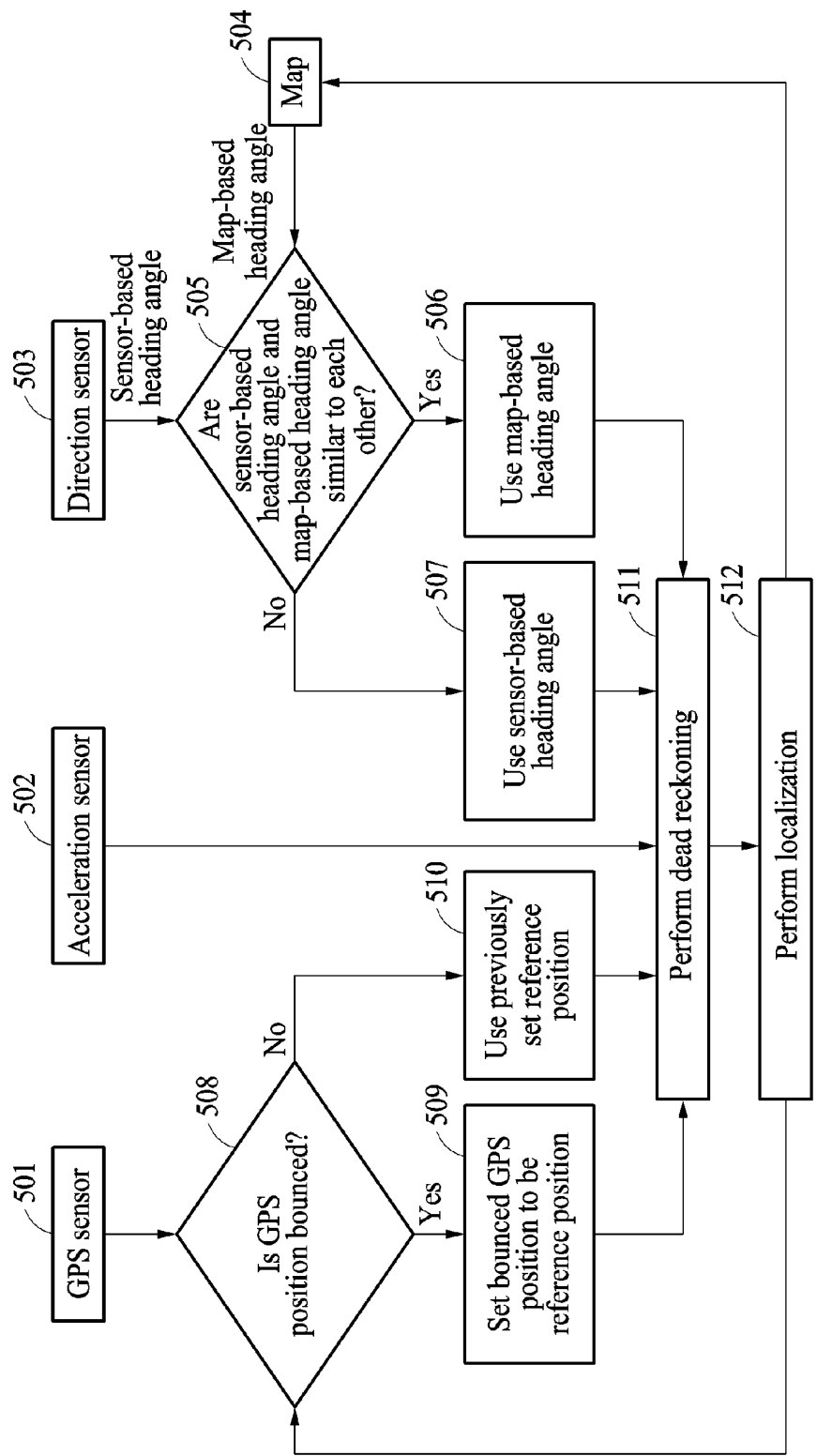
FIGS. 5A and 5B are diagrams illustrating another example of an object positioning method.

FIG. 5A is a diagram illustrating another example of an object positioning method. The operations in FIG. 5A may be performed in the sequence and manner as shown, although the order of some operations may be changed or some of the operations omitted without departing from the spirit and scope of the illustrative examples described. Many of the operations shown in FIG. 5A may be performed in parallel or concurrently. One or more blocks of FIG. 5A, and combinations of the blocks, can be implemented by special purpose hardware-based computer that perform the specified functions, or combinations of special purpose hardware and computer instructions. In addition to the description of FIG. 5A below, the descriptions of FIGS. 1-4 are also applicable to FIG. 5A, and are incorporated herein by reference. Thus, the above description may not be repeated here.

Referring to FIG. 5A, an object positioning apparatus performs dead reckoning using information obtained from a GPS sensor 501, an acceleration sensor 502, and a direction sensor 503, and information obtained from a map 504. In operation 505, the object positioning apparatus compares a sensor-based heading angle obtained from the direction sensor 503 and a map-based heading angle generated from the map 504. In operation 506, when the sensor-based heading angle and the map-based heading angle are similar to each other based on a threshold, the object positioning apparatus uses the map-based heading angle generated from the map 504 to perform the dead reckoning. In operation 507, when the sensor-based heading angle and the map-based heading angle are not similar to each other based on the threshold, the object positioning apparatus uses the sensor-based heading angle obtained from the direction sensor 503 to perform the dead reckoning.

In operation 508, the object positioning apparatus determines whether a GPS position is bounced using position information obtained from the GPS sensor 501. The determining of whether a GPS position is bounced or not will be further described hereinafter with reference to FIG. 5B.

Figure 5B:
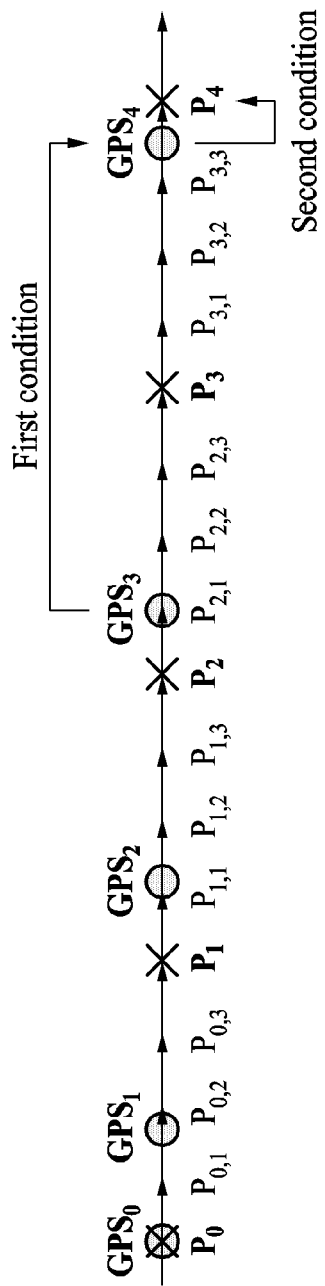

Referring to FIG. 5B, the object positioning apparatus obtains GPS positions at time points t, for example, $GPS_0$, $GPS_1$, $GPS_2$, $GPS_3$, and $GPS_4$ at time points $t_0$, $t_1$, $t_2$, $t_3$, and $t_4$, respectively, using a GPS sensor. The object positioning apparatus performs localization on the object to estimate positions, for example, $P_0$, $P_1$, $P_2$, $P_3$, and $P_4$, of the object at the time points $t_0$, $t_1$, $t_2$, $t_3$, and $t_4$.

In an example, a measurement period of the GPS sensor may be greater than a localization period of the object positioning apparatus. As performance of the GPS sensor is improved, the measurement period of the GPS sensor may be reduced. However, in general, a measurement period of most GPS sensors, except a high-cost and high-specification GPS sensor, is greater than the localization period of the object positioning apparatus. Although using a low-cost GPS sensor, the object positioning apparatus may determine whether a GPS position is bounced or not and may thus increase accuracy in localization based on a GPS position.

The object positioning apparatus performs localization on the object at time points $t_{0,1}$, $t_{0,2}$, and $t_{0,3}$ between the time points $t_0$ and $t_1$ to estimate positions $P_{0,1}$, $P_{0,2}$, and $P_{0,3}$ of the object at the corresponding time points $t_{0,1}$, $t_{0,2}$, and $t_{0,3}$. The object positioning apparatus performs localization on the object at time points $t_{1,1}$, $t_{1,2}$, and $t_{1,3}$ between the time points $t_1$ and $t_2$ to estimate positions $P_{1,1}$, $P_{1,2}$, and $P_{1,3}$ of the object at the corresponding time points $t_{1,1}$, $t_{1,2}$, and $t_{1,3}$. The object positioning apparatus performs localization on the object at time points $t_{2,1}$, $t_{2,2}$, and $t_{2,3}$ between the time points $t_2$ and $t_3$ to estimate positions $P_{2,1}$, $P_{2,2}$, and $P_{2,3}$ of the object at the corresponding time points $t_{2,1}$, $t_{2,2}$, and $t_{2,3}$. The object positioning apparatus performs localization on the object at time points $t_{3,1}$, $t_{3,2}$, and $t_{3,3}$ between the time points $t_3$ and $t_4$ to estimate positions $P_{3,1}$, $P_{3,2}$, and $P_{3,3}$ of the object at the corresponding time points $t_{3,1}$, $t_{3,2}$, and $t_{3,3}$.

The object positioning apparatus initializes the position $P_0$ of the object to be the GPS position $GPS_0$ at the time point $t_0$. At the time point $t_{0,1}$, the object positioning apparatus performs dead reckoning from the position $P_0$ to estimate the position $P_{0,1}$ of the object. At the time point $t_{0,2}$, the object positioning apparatus performs dead reckoning from the position $P_{0,1}$ to estimate the position $P_{0,2}$ of the object. The object positioning apparatus repetitively performs localization on the object.

Herein, a GPS position may be different from a position estimated by the object positioning apparatus. A position of the object that is estimated through the dead reckoning may be often ahead of a corresponding GPS position in a traveling direction. As illustrated in FIG. 5B, $GPS_1$, and $P_1$ indicate different positions although they are positions at the same time point. Similarly, $GPS_2$ and $P_2$ indicate different positions, and $GPS_3$ and $P_3$ indicate different positions. Thus, the object positioning apparatus determines whether a GPS position is bounced or not, and initializes a current position of the object to be a GPS position based on a result of the determining. Hereinafter, an example of how to determine whether a GPS position is bounced at the time point $t_4$ will be described.

In one example, the object positioning apparatus determines whether a difference between a current GPS position and a previous GPS position is greater than a threshold difference. As illustrated in FIG. 5B, the object positioning apparatus determines whether a first condition that a difference between a current GPS position, $GPS_4$, and a previous GPS position, $GPS_3$, at the time point $t_4$ is greater than the threshold difference is satisfied or not. When the first condition is satisfied, the object positioning apparatus determines that the current GPS position $GPS_4$ is bounced.

In another example, the object positioning apparatus determines whether a difference between a current position of the object and a current GPS position is less than a threshold difference. As illustrated in FIG. 5B, the object positioning apparatus performs localization on the object at the time point $t_4$ and estimates a current position, $P_4$, of the object, and determines whether a second condition that a difference between the current position $P_4$ of the object and the current GPS position $GPS_4$ is less than the threshold difference is satisfied or not. When the second condition is satisfied, the object positioning apparatus determines that the current GPS position $GPS_4$ is bounced.

In another example, when both the first condition and the second condition are satisfied, the object positioning apparatus determines that a GPS position is bounced. Referring to FIG. 5B, at the time point $t_4$, the object positioning apparatus determines whether both the first condition and the second condition are satisfied based on the previous GPS position $GPS_3$, the current GPS position $GPS_4$, and the current position $P_4$ of the object.

In an example, the object positioning apparatus compensates for a GPS position $GPS_t$ at a time point t, and determines whether at least one of the first condition or the second condition is satisfied or not using the compensated $GPS_t$. In addition, the object positioning apparatus initializes a position $P_t$ of the object at the time point t to be the compensated $GPS_t$. However, a GPS position measured by the GPS sensor may be information including a latency. Thus, in an example, the object positioning apparatus adds, to $GPS_t$, an empirical value $DR_t$ to which a latency is applied, and compensates for $GPS_t$ to be $GPS_t+DR_t$.

In one example, the object positioning apparatus generates $DR_t$ based on a speed and a direction of the object. In this example, $GPS_t$ indicates a position, and $DR_t$ is represented as a vector for compensating for $GPS_t$. The object positioning apparatus performs scaling on a magnitude component of $DR_t$ based on the speed of the object, and sets a direction component of $DR_t$ based on the direction of the object. For example, the object positioning apparatus scales up the magnitude component of $DR_t$ as the speed of the object increases. The object positioning apparatus compensates for $GPS_t$ using $DR_t$, a vector generated based on the speed and the direction of the object.

As illustrated in FIG. 5B, at the time point $t_4$, the object positioning apparatus compensates for the previous GPS position $GPS_3$ and the current GPS position $GPS_4$ to be $GPS_3+DR_3$ and $GPS_4+DR_4$, respectively. The object positioning apparatus then determines whether the first condition and the second condition are satisfied based on the compensated positions $GPS_3+DR_3$ and $GPS_4+DR_4$, and the position $P_4$. Herein, when the compensated current GPS position $GPS_4+DR_4$ is determined to be bounced, the object positioning apparatus initializes the position $P_4$ to be $GPS_4+DR_4$. At a time point $t_{4,1}$, the object positioning apparatus performs localization on the object from the initialized position $P_4$.

Referring back to FIG. 5A, in operation 509, when it is determined that the GPS position is bounced, the object positioning apparatus sets the bounced GPS position to be a reference position to be used to perform the dead reckoning. In operation 510, when it is determined that the GPS position is not bounced, the object positioning apparatus uses a previously set reference position without updating the reference position to perform the dead reckoning.

In operation 511, the object positioning apparatus performs the dead reckoning using the reference position, a speed sensed by the acceleration sensor 502, and a heading angle. In operation 512, the object positioning apparatus estimates a position of an object based on a result of the dead reckoning. The object positioning apparatus updates information included in the map 504 using the estimated position of the object. In an example, the object positioning apparatus may update a position of the object on the map 504 to detect a waypoint closest to the object.

The object positioning apparatus may subsequently perform localization based on the estimated position of the object, and repetitively perform localization at intervals.

Figure 6:
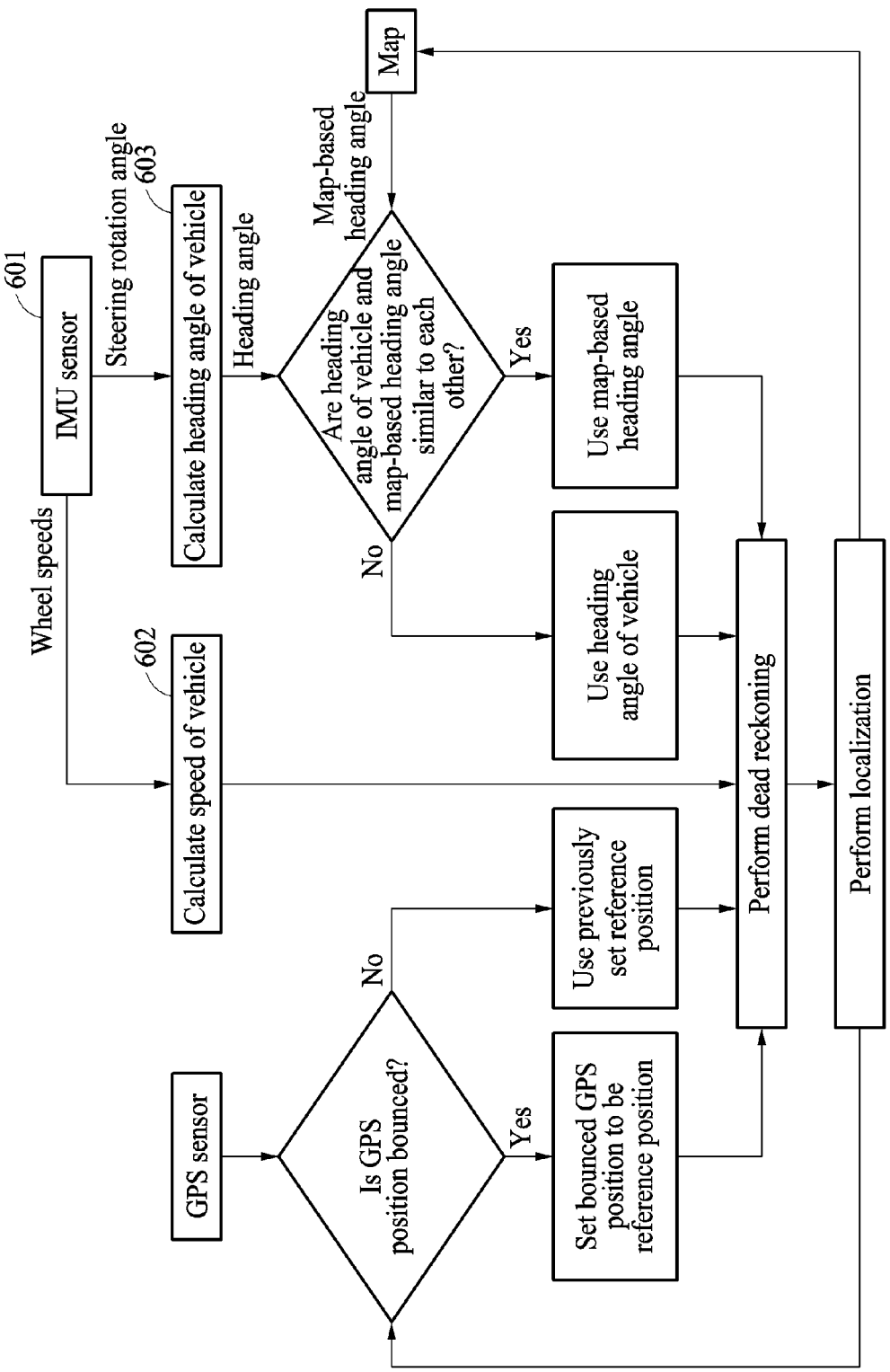
FIG. 6 is a diagram illustrating another example of an object positioning method.

FIG. 6 is a diagram illustrating another example of an object positioning method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5B are also applicable to FIG. 6, and are incorporated herein by reference. Thus, the above description may not be repeated here.

Referring to FIG. 6, an object positioning apparatus generates a speed and a heading angle of an object using information obtained from an IMU sensor 601. In the example illustrated in FIG. 6, the object is a vehicle.

The object positioning apparatus obtains wheel speeds of the vehicle from the IMU sensor 601 of the vehicle. In operation 602, the object positioning apparatus calculates a speed of the vehicle based on the obtained wheel speeds. In an example, the object positioning apparatus calculates the speed of the vehicle using a mean value of the wheel speeds of the vehicle. In an example, the object positioning apparatus calculates the speed of the vehicle using Equation 3.

$$s=(s_{fl}+s_{fr}+s_{rl}+s_{rr})/4 \qquad \text{[Equation 3]}$$

In Equation 3, s denotes a mean value of wheel speeds, where $s_{fl}$, $s_{fr}$, $s_{rl}$, and $s_{rr}$ denote a front left wheel speed, a front right wheel speed, a rear left wheel speed, and a rear right wheel speed, respectively.

The object positioning apparatus obtains an initial heading angle based on information obtained from a GPS sensor. Herein, the object positioning apparatus may determine the initial heading angle based on a plurality of position values obtained from the GPS sensor. For example, the object positioning apparatus may determine the initial heading angle by calculating direction information associated with a direction from a previous GPS position to a current GPS position.

The object positioning apparatus obtains a steering rotation angle of the vehicle from the IMU sensor 601 of the vehicle. In operation 603, the object positioning apparatus calculates a heading angle of the vehicle by applying the steering rotation angle to the initial heading angle. In an example, the object positioning apparatus calculate the heading angle of the vehicle by repetitively accumulating steering rotation angles to the initial heading angle. The object positioning apparatus may calculate the heading angle of the vehicle using Equation 4.

$$\theta_t=\theta_0+\Sigma_t\Delta\theta_t \qquad \text{[Equation 4]}$$

In Equation 4, $\theta_t$ denotes a heading angle of a vehicle at a time t, and $\theta_0$ denotes an initial heading angle, and $\Delta\theta$ denotes a steering rotation angle. $\Sigma_t\Delta\theta_t$ denotes a cumulative sum of steering rotation angles up to a time t.

The object positioning apparatus may calculate a speed and a heading angle of a vehicle using an internal sensor of the vehicle, without an acceleration sensor and a direction sensor. An operation of performing dead reckoning using a speed and a heading angle of the vehicle and a map-based heading angle is described above.

Figure 7:
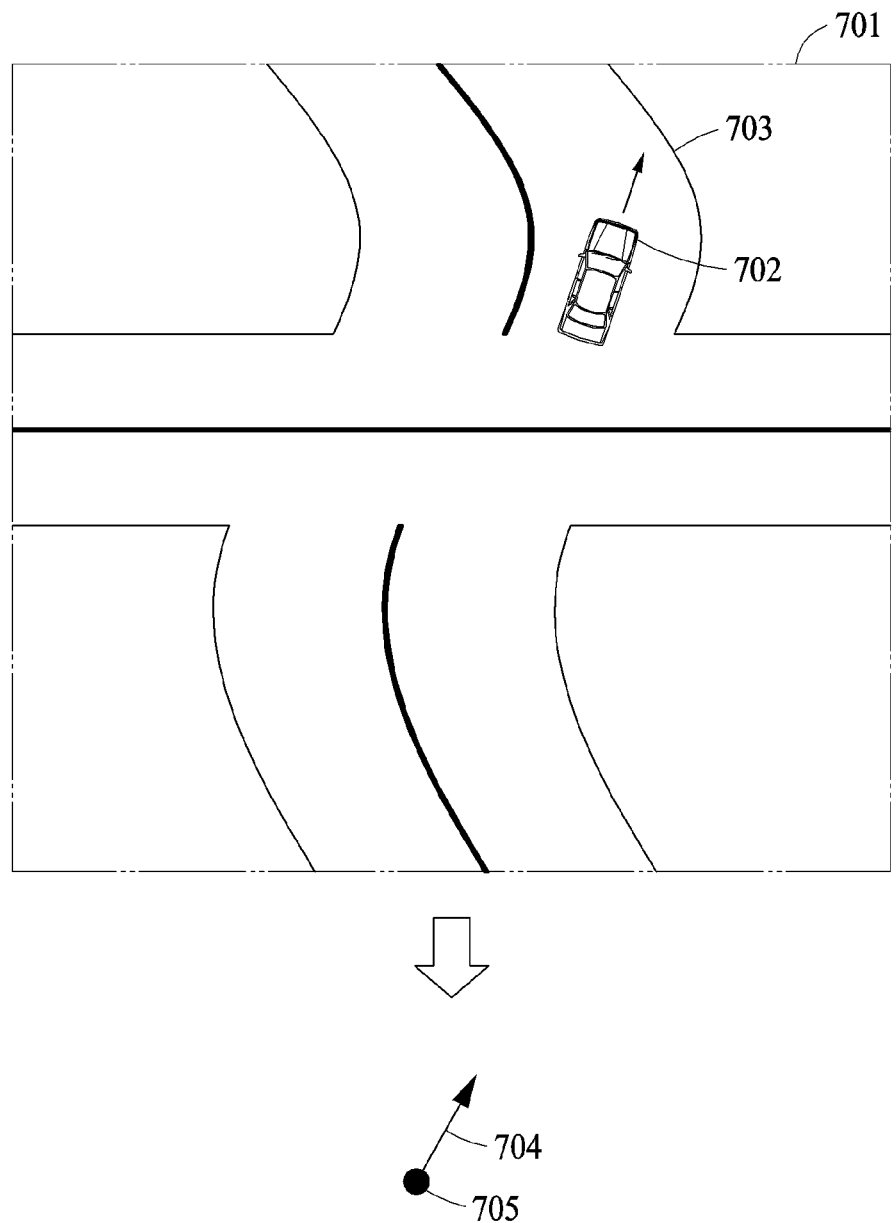
FIG. 7 is a diagram illustrating another example of an operation of obtaining a map-based heading angle.

FIG. 7 is a diagram illustrating an example of an operation of obtaining a map-based heading angle.

Referring to FIG. 7, an object positioning apparatus obtains a map-based heading angle 704 of an object 702 based on a map 701 including a curve of a road 703. The object positioning apparatus obtains a curvature of the road 703 from the map 701 based on a most recently measured position of the object 702. The object positioning apparatus obtains the map-based heading angle 704 of the object 702 based on the obtained curvature. As described above, the object positioning apparatus estimates a current position of the object 702 using the map-based heading angle 704 and a reference position 705.

The curvature of the road 703 may be mapped in the map 701 to obtain the map-based heading angle 704. For example, a curvature of each of sections of roads on the map 701 may be set, and stored in a database.

Figure 8:
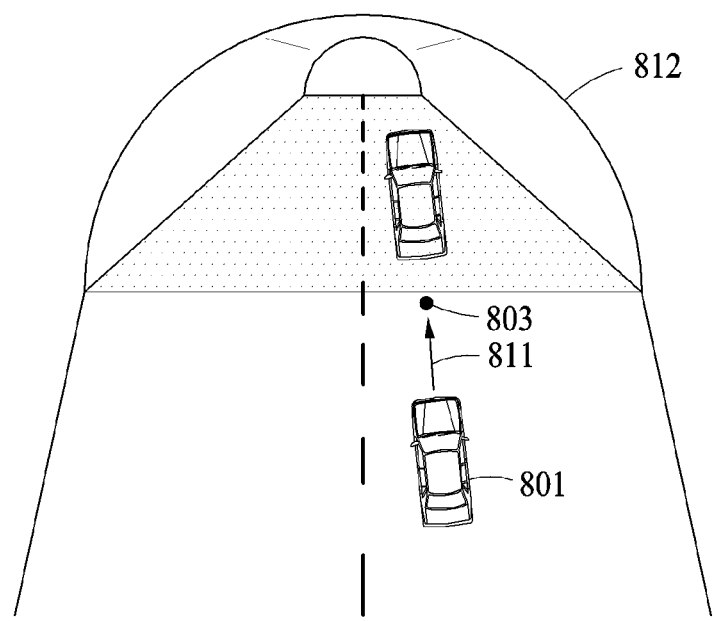
FIG. 8 is a diagram illustrating an example of an operation of performing localization on an object using a map-based heading angle.

FIG. 8 is a diagram illustrating an example of an operation of performing localization, or locating an object, using a map-based heading angle.

Referring to FIG. 8, an object positioning apparatus may desirably locate a vehicle 801 even when the vehicle 801 travels in a tunnel 812. Because a GPS position is not readily received in the tunnel 812, accuracy in localization using a GPS position may be degraded.

The object positioning apparatus performs localization using a map-based heading angle 811 of the vehicle 801, and determines a position that is most recently estimated before the vehicle 801 enters the tunnel 812 to be a reference position 803. The object positioning apparatus generates a map-based heading angle of the vehicle 801 in the tunnel 812 using a map including a curve of a road in the tunnel 812 or a map including a road in the tunnel 812 represented using waypoints. The object positioning apparatus performs dead reckoning using the map-based heading angle of the vehicle 801 in the tunnel 812, and estimates a current position of the vehicle 801 based on a result of the dead reckoning. Through this, the object positioning apparatus may accurately locate an object by generating a map-based heading angle of the object using a map, even in an environment in which a GPS position is not readily obtained or received.

Figure 9:
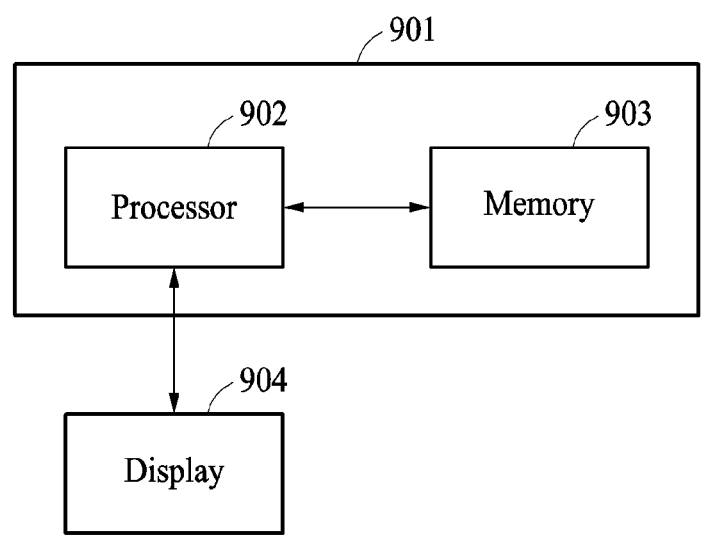
FIG. 9 is a diagram illustrating an example of an object positioning apparatus.

FIG. 9 is a diagram illustrating an example of an object positioning apparatus.

Referring to FIG. 9, an object positioning apparatus 901 includes a processor 902, a memory 903, and display 904. The object positioning apparatus 901 may be provided in a vehicle or a terminal, or installed outside the vehicle or the terminal, to communicate with the vehicle or the terminal.

The memory 903 may store a program to process instructions associated with localization or locating an object, and instructions used to perform the operations described with reference with FIGS. 1 through 8. In an example, the memory 903 stores map information. In an example, the memory 903 stores information detected or sensed from a sensor or a camera, and information received from a server. Further details regarding the memory 903 is provided below. The sensor may include, for example, a direction sensor, an acceleration sensor, a gyro sensor, an IMU sensor, a radio detection and ranging (RaDAR) sensor, a light detection and ranging (LiDAR) sensor, a GPS, and other sensors.

The processor 902 may load the program recorded in the memory 903 and execute the program. The processor 902 may locate the object, and display the location of the object on a display 904. In a case of the object being a vehicle, the processor 902 may control traveling of the vehicle using the result of the locating. For a detailed description of operations of the processor 902, reference may be made to the descriptions provided above. Further details regarding the processor 902 is provided below.

In an example, the display 904 is a physical structure that includes one or more hardware components that provide the ability to render a user interface and/or receive user input. In an example, the display 904 can be embedded in the object positioning apparatus 901. In an example, the display 904 is an external peripheral device that may be attached to and detached from the object positioning apparatus 901. The display 904 may be a single-screen or a multi-screen display. In an example, the processor 904 projects the object and the object's direction to a wind shield glass or a separate screen of the vehicle using a head-up display (HUD). However, the displaying of the object is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the object positioning apparatus 901 may be used without departing from the spirit and scope of the illustrative examples described.

The object positioning apparatus, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object positioning method comprising:
   obtaining, using at least one sensor, a speed and a sensor-based heading angle of an object, wherein the at least one sensor comprises a light detection and ranging (LiDAR) sensor or a camera;
   obtaining a reference position of the object;
   obtaining a map-based heading angle of the object based on waypoints on a map, wherein the waypoints on the map comprise a structure or a geographical feature; and
   determining a current position of the object based on the reference position and the map-based heading angle,
   wherein the determining of the current position comprises:
      generating a second heading angle based on the map-based heading angle and the sensor-based heading angle;
      performing dead reckoning based on the second heading angle and the speed; and
      determining the current position of the object based on a result of the dead reckoning,
   wherein the obtaining of the reference position comprises:
      periodically obtaining GPS positions from a GPS sensor;
      updating the reference position using a current GPS position based on a first difference between the current GPS position and an initialized dead reckoning position being below a threshold; and
      setting the reference position to the initialized dead reckoning position based on the first difference is not below the threshold, and
   wherein the generating of the second heading angle comprises:
      generating the second heading angle based on the map-based heading angle, in response to a second difference between the map-based heading angle and the sensor-based heading angle being in a range; and
      generating the second heading angle based on the sensor-based heading angle, in response to the second difference between the map-based heading angle and the sensor-based heading angle being outside the range.

2. The object positioning method of claim 1, wherein the map comprises a road represented using the waypoints on a single line.

3. The object positioning method of claim 1, wherein the obtaining of the map-based heading angle comprises:
   detecting a waypoint closest to a most recently estimated position of the object; and
   calculating the map-based heading angle of the object based on the detected waypoint and a next waypoint subsequent to the detected waypoint.

4. The object positioning method of claim 1, wherein the obtaining of the map-based heading angle comprises:
   detecting a waypoint among the waypoints based on a most recently estimated position of the object; and
   determining the map-based heading angle to be a heading angle corresponding to the detected waypoint.

5. The object positioning method of claim 1, wherein the object comprises a vehicle, wherein the determining of the current position of the object further comprises:
   determining the current position of the object based on the sensor-based heading angle; and
   generating lane change information of the object based on the determined current position.

6. The object positioning method of claim 1, wherein the generating of the second heading angle comprises:
   compensating for the sensor-based heading angle using the map-based heading angle; and
   generating the second heading angle based on the compensating.

7. The object positioning method of claim 1, wherein the generating of the second heading angle comprises:
   generating the second heading angle based on applying weights to the map-based heading angle and the sensor-based heading angle.

8. The object positioning method of claim 7, wherein the applying of the weights comprise increasing a weight of the map-based heading angle, in response to the second difference between the map-based heading angle and the sensor-based heading angle being smaller than a second threshold.

9. The object positioning method of claim 1, wherein the at least one sensor comprises an acceleration sensor and a direction sensor.

10. The object positioning method of claim 1, wherein the object comprises a vehicle, wherein the obtaining of the sensor-based heading angle of the object comprises:
obtaining an initial heading angle from a global positioning system (GPS) sensor;
obtaining a steering rotation angle of the vehicle from the at least one sensor; and
calculating the sensor-based heading angle of the object by applying the steering rotation angle to the initial heading angle.

11. The object positioning method of claim 1, wherein the object comprises a vehicle, wherein the obtaining of the speed of the object comprises:
obtaining wheel speeds of the vehicle from the at least one sensor of the vehicle; and
calculating the speed of the object based on the wheel speeds.

12. The object positioning method of claim 1, wherein the waypoints are generated based on position information recorded along a lane on a road.

13. The object positioning method of claim 1, wherein the waypoints comprise pieces of position information recorded along lanes on a road that are converted to represent a single lane.

14. A non-transitory computer-readable storage medium storing instructions that, when executed by a processor, cause the processor to perform the object positioning method of claim 1.

15. An apparatus for determining a position of an object, comprising:
at least one sensor, wherein the at least one sensor comprises a light detection and ranging (LiDAR) sensor or a camera;
a memory configured to store instructions and waypoints, the waypoints being generated based on position information recorded along a road; and
a processor configured to execute the instructions to:
obtain, using the at least one sensor, a speed and a sensor-based heading angle of the object,
obtain a reference position of the object,
detect a waypoint, from among the waypoints, proximate to the reference position, wherein the waypoint comprises a structure or a geographical feature,
estimate a map-based heading angle of the object based on the detected waypoint and a subsequent waypoint from among the waypoints, and
determine a current position of the object based on the reference position and the map-based heading angle,
wherein the processor is further configured to determine the current position by:
generating a second heading angle based on the map-based heading angle and the sensor-based heading angle,
performing dead reckoning based on the second heading angle and the speed, and
determining the current position of the object based on a result of the dead reckoning,
wherein the processor is further configured to obtain the reference position by:
periodically obtaining GPS positions from a GPS sensor;
updating the reference position using a current GPS position based on a first difference between the current GPS position and an initialized dead reckoning position being below a threshold; and
setting the reference position to the initialized dead reckoning position based on the first difference not being below the threshold, and
wherein the processor is further configured to perform generating the second heading angle by:
generating the second heading angle based on the map-based heading angle, in response to a second difference between the map-based heading angle and the sensor-based heading angle being in a range; and
generating the second heading angle based on the sensor-based heading angle, in response to the second difference between the map-based heading angle and the sensor-based heading angle being outside the range.

16. The apparatus of claim 15, wherein the memory is further configured to store the map-based heading angle corresponding to the waypoint.

17. The apparatus of claim 15, wherein the processor is further configured to detect the subsequent waypoint based on a recognized direction of the object.

* * * * *